Nov. 21, 1967  R. A. THOMAS  3,353,774
FASTENING DEVICES
Filed Aug. 30, 1965
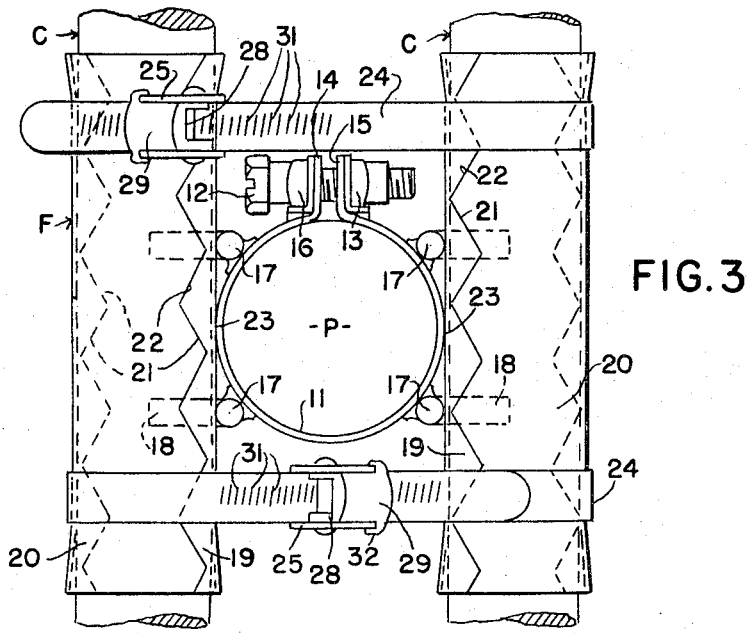
FIG. 3
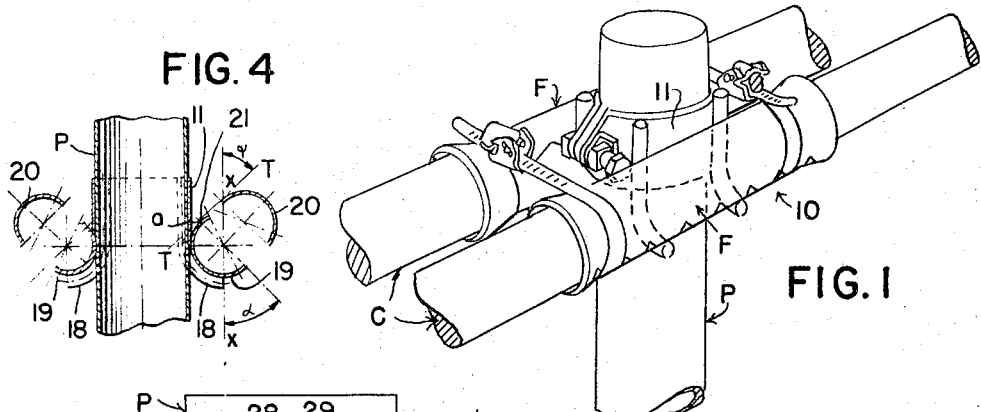
FIG. 4
FIG. 1
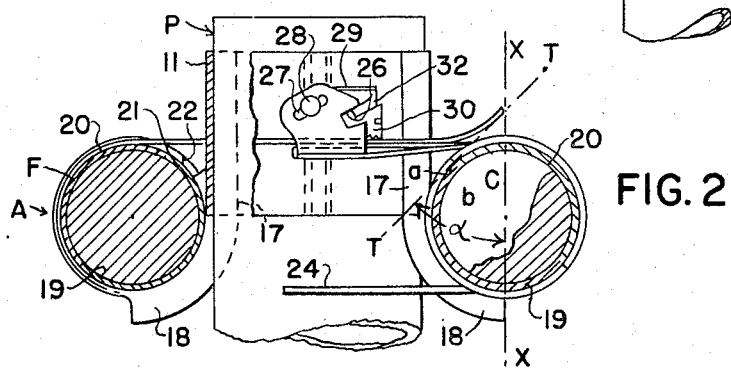
FIG. 2
*INVENTOR.*
Robert Albert Thomas
*by* Sparrow and Sparrow
ATTORNEYS.

United States Patent Office 3,353,774
Patented Nov. 21, 1967

3,353,774
FASTENING DEVICES
Robert Albert Thomas, Kortrijk, Belgium, assignor to
Trefileries Leon Bekaert, PVBA, Zwevegem, Belgium
Filed Aug. 30, 1965, Ser. No. 483,671
Claims priority, application Netherlands, Oct. 15, 1964,
64—11,986
10 Claims. (Cl. 248—68)

This invention relates to fastening devices for fixing a cable or cables to a pole or the like, in particular for road safety barriers or deflecting fences or other fences bordering roads, the device including a clamping or fastening ring which in use surrounds the pole.

Belgian Patent No. 635,912 granted in the name of applicant's assignee describes and illustrates such a fastening device in which the ring not only surrounds the pole but also two cables fixed to the pole, the means for fastening each cable to the ring comprising a resilient member by means of which the clamping force is transmitted from pegs to the clamping ring and cables. As a result when a motor vehicle crashes against the cables and tends to detach the cables, the fastening means will be loosened on the pole, the resilient member yielding resiliently. If due to the force of the collision the pole is brought into an inclined position, the cables will be able to slide upwardly along the pole, together with the clamping ring. In this way after the collision the cables assume again their extended position at a height which is practically equal to that prior to the collision. This has the advantage that in the event of a fresh collision, before the necessary repairs have been carried out on the safety barrier or fence, the cables do not remain suspended at too low a height, which would have the effect of overturning a vehicle in collision with cables which were positioned too low.

This fastening device has, however, a disadvantage; the cables in fact always remain fixed to the fastening ring, i.e., in the event of a collision the cables cannot move longitudinally with respect to the fastening ring. Consequently, the additional tension which is produced in the cables by the crash, must be completely absorbed by that section of each cable or the "span" between the two poles, between which the collision took place. Furthermore, very high tension forces are exerted on this section which can have the result of a permanent deformation by the cable being lengthened.

The invention has the object of providing an improved fastening device which, while fully preserving the advantage of the known above-mentioned device, overcomes the drawback referred to above.

According to the invention there is provided a device for fastening a cable or cables to a pole or the like comprising a fastening member adapted to engage tightly around the pole or the like and a rigid casing for each cable consisting of two mating portions which together embrace such cable, at least one pair of longitudinal mating edges of said two portions being provided with interengaging teeth or serrations, one of said portions being rigidly secured to said fastening member while the other is held in engagement with said one portion by an adjustable strap or like tensionable device adapted, when a predetermined maximum tension is exceeded to be releasable.

Preferably both pairs of mating edges of said two portions are provided with interengaging teeth or serrations which serve as oblique stops which together have a cam like action on the two portions. In a preferred embodiment the two portions are each in the form of semi-cylindrical half shells which together tightly embrace the cable.

When the cable is subjected to tension, for example, due to a collision with a vehicle, the half-shell which is not fixed to the ring tends due to friction to be taken along by the cable and the oblique stops cause it to separate from its associated half-shell; the strap extends resiliently so that the cable can slide relative to the fastening device and in the said casing and the tension force can thus be distributed over several spans, i.e. over a greater length of the cable which will thus not be subjected to a permanent elongation. If the tension in the strap reaches its limiting value, said strap will be released, thus releasing the cable from the fastening device concerned.

Where two cables are provided two diametrically opposed casings are provided on the ring; each casing will preferably have two parallel tightening straps or like tensionable means which are likewise diametrically opposed to one another relative to the ring.

A preferred embodiment of the invention will now be described with reference to the accompanying drawings, in which:

FIG. 1 is a perspective view of the assembly;

FIG. 2 is a view partly in section and partly in elevation of the fastening device according to the invention, in place on a pole with two cables fixed thereto;

FIG. 3 is a plan view of FIG. 2;

FIG. 4 is an elevation view of the fastening device in place on a pole without the cables or upper casing fixed thereto.

In the embodiment shown, the fastening device 10 is intended to fasten two cables C to a pole P.

Device 10 comprises a fastening ring 11 which can be engaged around a pole P. Ring 11 is tightened by means of a screw 12 and a nut 13; the screw passed through the two ends 14 and 15 of ring 11, these ends being turned outwardly and extending parallel. The nut 13 is secured, for example, by welding, to the flange 15, while the other flange has a non-threaded face 16 abutting on the screw head.

Four supports 17 are fixed on the ring 11, for example, by welding, two each on opposite wall portions thereof as clearly seen in FIGS. 1 and 2. Each of them is bent at its lower portion 18 in the form of a quarter circle.

The bent portions 18 are mounted on the pole P at the same level and on either side so that on each side of the pole the supports 17 form bearing surfaces located at the same level to support a rigid cylindrical casing F. Each casing is made up of two semi-cylindrical half-shells 19 and 20 fitting together so as to embrace one of the two cables. The two free edges, 21 and 22, of these two half-shells 19 and 20 are provided with serrated teeth, i.e. oblique stops, in such a manner that each edge of each half-shell forms a cam surface for the edge of the associated half-shell, thus any longitudinal displacement of the half-shell 20 relative to the other half-shell 19 will cause a transverse displacement of the two half-shells away from one another.

The half-shell 19 of each casing is fixed rigidly to the curved portions 18 of the supports 17, on which that half-shell rests, the latter being also welded to the ring at the contact point 23. This means that the half-shell 19 has a very stable position with respect to the pole. Furthermore, the diametrical separation line of the two half shells 19 and 20 (assuming it would be a straight line, not a toothed or serrated one) is arranged in such manner that it is inclined at an angle α of approximately 45° at the central, diametrical vertical plan X—X through the center of the casing, that is, of the cable C which is lodged in the casing. In other words a tangential plan T—T drawn at the upper edge 21 of half shell 19 also forms the angle α of approximately 45° with the central diametrical plan X—X drawn through the center of the casing (see FIG. 4). Half shell 19 is rigidly fixed to curved portions 18 at this angle in order to facilitate the release of the cable C, as hereinafter explained. Angle α may vary within certain narrow limits, these limits being defined by the location of upper longitudinal edge 21 of lower half shell 19 between positions b and c, as shown in FIG. 2.

The device has two securing straps 24 each being provided with an adjustable device for tensioning and locking the strap which device is adapted to release the strap at a predetermined tension. In the embodiment, this device comprises, fixed on one of the ends of the strap, a clasp 25 provided in its two branches with a slot 26 and an aperture 27. Through these apertures there extends an axle 28 for the pivotal mounting of a support 29 for a screw 30. This screw swivels in the support and its threads cooperate with grooves 31 recessed in the other end of the strap, in order to fix the two ends of the strap relative to one another, wings 32 of the said support 29 engage in the slots 26 of the clasp 25. A screwing up or unscrewing of screw 30, in this position, permits an increase or decrease of the tension of the strap. At a given maximum tension, the grooved end of the strap slides with respect to the screw and escapes therefrom.

The fastening device is used and operated as follows: the ring 11 is fixed to the pole P which is sunk into the ground or a foundation block, at a height which corresponds to that at which it is intended that the cables C should be suspended above ground level. Each cable C is then placed at one side of the pole into the corresponding half-shell 19, and the half-shells 20 are then placed like covers over the cables, in such a manner that the toothed edges 21 and 22 of the half-shells 19 and 20 interengage. Then, the tightening straps 24 are fixed around the casings F and tensioned by means of their tensioning devices.

By means of this tensioning, not only are the half-shells 20 which are placed freely against the half-shells 19, prevented from being detached from the latter, but furthermore they exert a pressure on half-shells 19. The cables C are thus secured in each of the rigid casings F.

If a vehicle for any reason damages one of the two cables C between two consecutive poles P and a pole is thus caused to assume a more or less inclined position under the action of the pull on the cable (or cables), the latter tends as a result of friction to pull the shell 20 along with it which, because of the toothed edges 21 and 22 is detached laterally from the half-shell 19 so that the cable can slide longitudinally in the interior of the loosened casing F.

It should be noted that the longitudinal displacement of the half-shell 20 relative to half-shell 19 can only take place to the extent to which the friction between the teeth of the edges 21 and 22 has been overcome. This means that part of the excess tension exerted on the cable is absorbed by casing F. Furthermore, due to the fact that the cable has acquired a certain freedom of movement, the accumulated tension can be transmitted beyond the two poles that limit the span in which the impact took place, i.e., the tension is transmitted to the fastening devices of the adjacent poles, which leads to a loosening of their tightening straps in succession.

Thus, the excess tension caused by the impact, which can be considerable, is transmitted over a length of cable, which is equal to at least two spans. This means that the risk of a break or damage of the cable becomes much smaller. If a vehicle crashes against the cables with such an impact that the poles of the span deviate strongly from their vertical position, the impact can be sufficient to release the adjustable devices, the screw threads 30 tearing the grooves 31 out of the tightening straps 24. The latter are liberated from the casings F, allow the half-shells 20 to be detached from the half-shells 19 and the cables are thus entirely free of the fastening devices. This means that if the poles are completely destroyed due to the impact, the cables are not broken and can again assume their original position above ground level. The danger caused by cables suspended at too low a height is thus avoided.

The separation of the cables from the half-shells 19 and their removal in a case in which they have to be detached from the fastening devices are facilitated by the fact that the tangential plane T—T of the half-shells along their upper edges—supposed to be rectilinear—forms a certain angle $x$ with the critical plane X—X.

It will furthermore be noticed that the half-shells preferably have a flared shape at their ends, which also prevents any damage to the cable when the latter has to extend in a more or less oblique direction with respect to the longitudinal axis of the casing due to an impact to which the cable is subjected.

The invention is by no means limited to the embodiment shown and described, which has been chosen by way of example only. Thus, for example, it may suffice to fix a cable to only one side of the pole, which means that only one rigid fastening casing is required, in such case, the other side of the pole may have a solid bar or rod parallel to the casing around which the tightening straps are passed.

While the invention has been described and illustrated with respect to a certain preferred example which gives satisfactory results, it will be understood by those skilled in the art after understanding the principle of the invention that various other changes and modifications may be made without departing from the spirit and scope of the invention and it is intended therefore in the appended claims to cover all such changes and modifications.

I claim:

1. A device for fastening cable means to a pole, comprising clamping means to engage around said pole and tightening means adapted to hold said clamping means in tight engagement with said pole, supporting means secured to said clamping means on respective opposite wall portions thereof, a casing comprisng two mating portions which together are adapted to embrace said cable means, one of said mating portions being rigidly secured to one of said supporting means, said mating portions being provided with at least one pair of longitudinal mating edges having interengaging oblique serrations, adjustable tensionable means, the other of said mating portions being held in engagement with said one of said mating portions by said tensionable means when said mating portions embrace said cable means and said tensionable means being adapted to be releasable when a pre-determined maximum tension is exceeded.

2. A device as claimed in claim 1 in which both pairs of said mating edges of said two mating portions are provided with interengaging oblique serrations.

3. A device as claimed in claim 1 in which said mating portions are of substantially semi-cylindrical shape.

4. A device as claimed in claim 1 in which the ends of said casing are flared.

5. A device as claimed in claim 1 in which a tangent to the upper edge of said one of said motion portions of said casing makes an angle of approximately 45° with the vertical diametrical plane through said casing, said upper edge being located between said plane and said clamping means when the latter engages around said pole.

6. A device as claimed in claim 5, and wherein both pairs of said mating edges of said two mating portions are provided with inter-engaging oblique serrations.

7. A device as claimed in claim 1 in which two of said tensionable means are provided, one on each side of said clamping means.

8. A device as claimed in claim 1 and wherein there are two of said casings each having a respective mating portion secured to each of said supporting means, said casings being diametrically opposite to each other and wherein there are two of said tensionable means, one on each side of said clamping means.

9. A device as claimed in claim 1 and the other of said supporting means being a rigid member extending parallel to said casing, said tensionable means extending around said casing and said rigid member.

10. A device according to claim 1, and wherein said one of said supporting means comprises substantially a bar having a bent portion forming a bearing surface for said casing.

References Cited

UNITED STATES PATENTS

| | | | |
|---|---|---|---|
| 1,381,192 | 6/1921 | Hiss | 248—69 |
| 1,531,411 | 3/1925 | Perry | 339—251 |
| 1,625,716 | 4/1927 | Edwards | 248—66 |
| 1,824,459 | 9/1931 | Beckwith | 248—74 |
| 1,833,578 | 11/1931 | Jester | 248—64 |
| 1,966,414 | 7/1934 | Main | 248—63 |
| 2,386,629 | 10/1945 | North et al. | 24—274 |
| 2,858,106 | 10/1958 | Anton et al. | 254—190 |
| 2,884,214 | 4/1959 | Wrobel | 248—74 |

ROY D. FRAZIER, *Primary Examiner.*

CLAUDE A. LE ROY, *Examiner.*

R. P. SEITTER, *Assistant Examiner.*